United States Patent [19]

Sandgänger

[11] 4,369,374

[45] Jan. 18, 1983

[54] WAVE-MOTION-DRIVEN POWER GENERATOR STATION

[76] Inventor: Karl Sandgänger, Helmholtzstrasse 11, D-6650 Homburg (Saar), Fed. Rep. of Germany

[21] Appl. No.: 172,828

[22] Filed: Jul. 28, 1980

[30] Foreign Application Priority Data

Jul. 27, 1979 [DE] Fed. Rep. of Germany ....... 2930531

[51] Int. Cl.³ .............................................. F03B 13/12
[52] U.S. Cl. ....................................... 290/53; 60/497; 417/330
[58] Field of Search ....................... 290/42, 43, 54, 55; 60/497; 417/330

[56] References Cited

FOREIGN PATENT DOCUMENTS 124470 12/1925 Switzerland ............................ 416/4
2002458 2/1979 United Kingdom .................. 290/53

*Primary Examiner*—J. V. Truhe
*Assistant Examiner*—Shelley Wade
*Attorney, Agent, or Firm*—Kontler, Grimes & Battersby

[57] ABSTRACT

In a stationary wave-motion-driven power generator station, a rotatable cylindrical steel structural body is mounted, with its axis substantially horizontal. The ends of the axle of the body are located in bearings which can move up and down to immerse the lower portion of the body in the sea. Vanes are provided on the body to cause the latter to be rotated by wave motion and are in the form of annular prominences around the body having outwardly-decreasing approximately triangular cross-sections.

25 Claims, 4 Drawing Figures

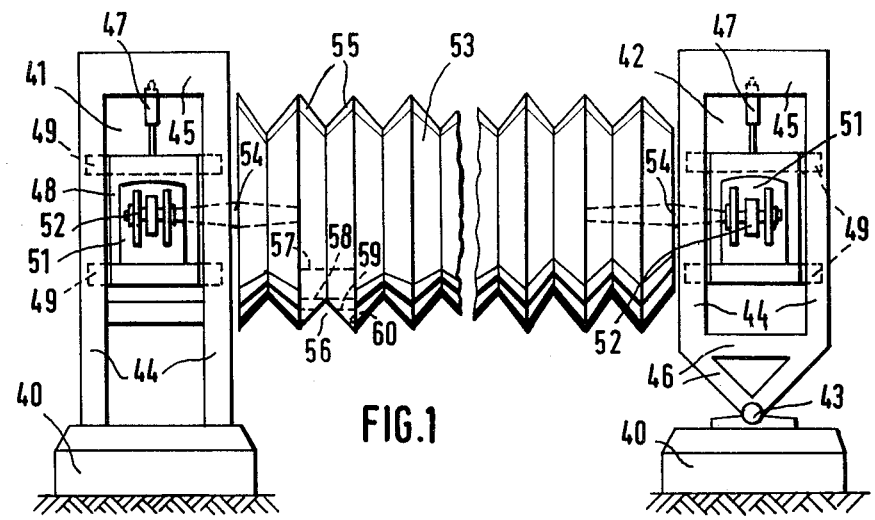
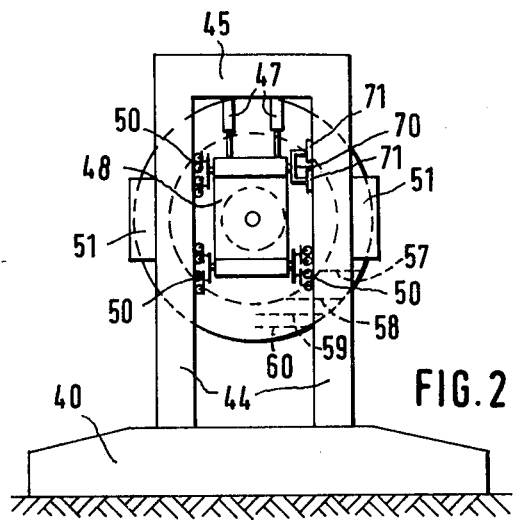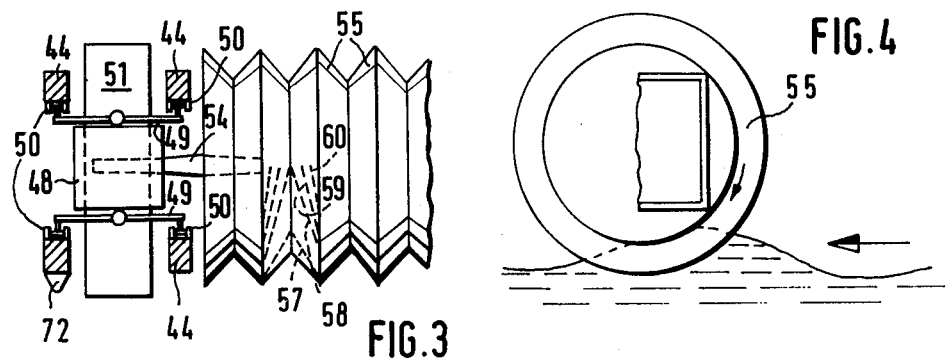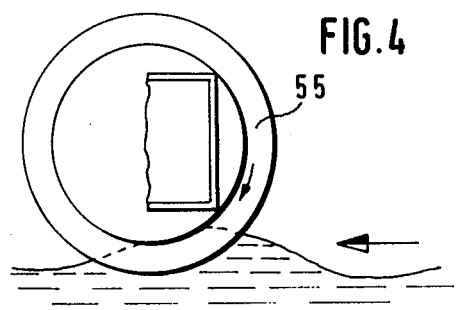

WAVE-MOTION-DRIVEN POWER GENERATOR STATION

The invention relates to a stationary wave-motion-driven power station, supported from the sea bed, in which a cylindrical steel structural body, especially a body having a bridge in latticework or stiffened tube structure as a supporting nucleus, is mounted so as to be rotatable about its longitudinal axis in at least one bearing. The bearing is guided so as to move up and down on a pillar which is anchored on the sea bed, so that the bottom of the body is immersed in the sea and vanes arranged on the outer curved surface of the body are acted upon by the wave motion to rotate the body which provides the drive for at least one generator.

Such a power station is known from German Offenlegungsschrift No. 27 36 640. The waves strike the vanes and thus set the cylindrical steel structural body into rotation.

This rotation, however, tends to be inhibited or braked by the actual passage of the vanes through the water.

The problem underlying the invention is to reduce the resistance of the vanes to passage through the water.

Pursuant hereto, the present invention provides a stationary wave-motion driven power generator station installed on the sea bed, including a cylindrical steel structural body comprising a bridge structure of openwork construction as a supporting nucleus mounted with its axis substantially horizontal and so as to be rotatable about said axis. The body is mounted on at least one bearing. A pillar is anchored to the sea bed and is adapted for the bearing to move up and down the same so that the body, which has vanes projecting from its outer curved surface, may be immersed from above into the sea for the wave motion to rotate said body and thereby drive at least one generator mounted on said pillar. The generator station is characterized in that said vanes are in the form of annular prominences which are ranged side-by-side axially on the said curved surface of said cylindrical steel structural body and have an outwardly-decreasing, cross-section.

Despite their extent in the direction of movement, the prominences forming the vanes provide impact surfaces by reason of the intermediate spaces between the prominences becoming narrower in the tangential direction towards the perpendicular central plane or, expressed differently, the sides of the prominences stand obliquely to the direction of movement, as will be made clearer later on.

In this design, during their passage through the water, the vanes generally offer no resistance to flow.

Moreover, where they rise out of the water, they cannot scoop up and entrain water, which would counteract the rotation. The surface of the rotating steel structural body may be completely closed and water-tight. Then even wind forces will be unable to act on the surface of the body counter to the direction of rotation. on the generated surface of the body. The waves do not exert on the annular vanes any impacts which load the entire structure; they are broken down slowly during their passage through the intermediate spaces between the prominences. The rotating steel structural body thus achieves a high speed of rotation.

Preferably only a small fraction, at the most a quarter, of the radial height of the annular prominences is immersed, related to a calm sea. Contemplated differently, the cylindrical steel structural body is preferably immersed to such an extent that the waves, on average, reach only approximately as far as the bottoms between the prominences.

The radial height of the prominences should advantageously be from 4 to 8 m, preferably 5 to 7 m.

As has been said, the surface of the cylindrical steel structural body can be water-tight, so that the steel structural body is buoyant in the water; it may instead, however, be constructed with water-tight cells.

Instead of floating, the steel structural body can be suspended from the pillar or the pillars by way of hydraulic cylinders which can be stressed in tension as well as in compression.

Depending on the design of the vanes, the wave force is, in certain circumstances, better utilised if the steel structural body cannot be raised by the water and thus yields.

The invention will be described further, by way of example, with reference to the accompanying drawing, in which:

FIG. 1 is a diagrammatic front view of a preferred embodiment of the wave-motion-driven power station according to the invention;

FIG. 2 is a side view of the embodiment of FIG. 1, taken from the left hand side of FIG. 1;

FIG. 3 is a fragmentary plan view of the left-hand end of the power station shown in FIG. 1; and FIG. 4 is a diagrammatic side view, corresponding approximately to FIGS. 1 to 3, and showing the power station in operation.

The illustrated practical embodiment of the wave-motion-driven power station comprises two pillars 41 and 42, made of reinforced concrete or of steel framed construction, anchored on respective reinforced concrete foundations 40. The pillar 41 is substantially rigid. The pillar 42 is slightly tiltable about a hinge 43. Both pillars 41, 42 consist substantially of four perpendicular supports 44 which are connected at their upper ends by four horizontal beams 45; the supports of the pillar 42 converge at the lower end of the pillar, by a beam construction 46, towards the hinge 43.

Suspended in each of the pillars 41 and 42 are two hydraulic cylinders 47, a supporting basket or lattice 48 of steel framed construction which is guided so as to move up and down by way of two upper beams 49 and two lower beams 49, as well as double wheel rocker arms 50 which are mounted at the beam ends and which butt against the supports 44.

The two supporting baskets 48 each contain a respective elongate powerhouse 51 which protrudes on both sides from the support basket.

In the two powerhouses, mounted in two bearing and generator units 52 are the two ends of a cylindrical steel structural body 53 having axle journals 54. The static construction of the steel structural body and the mounting thereof are, for example, substantially as described in published British Patent Application No. 20 02 458A.

Provided on the surface of the cylindrical steel structural body 53 are frusto-conical jackets of welded sheet construction. These are ranged tightly side-by-side in alternately reversed disposition. They thus define annular prominences 55 of an isosceles-triangular cross-section with a vertex angle somewhat less than 90°.

In one of the intermediate spaces 56 between two of the annular prominences 55, four horizontal planes 57 to 60 have been indicated with broken lines in FIGS. 1, 2 and 3. The plan view in FIG. 3 shows the lines of intersection of these planes with the frusto-conical surfaces of the two adjoining prominences 55, i.e. the positions in which these surfaces offer themselves as impact surfaces relative to a stratum of water, moving horizontally through the wave motion, in the relevant plane. These positions are oblique, that is, always have components transversely to the wave motion, to which impulses can be applied. Expressed differently, the cross-section of the passage available for the water moved by the waves narrows. The wave is thereby broken down; its momentum is converted into rotation of the cylindrical steel structural body 53. Behind this the sea is then comparatively calm. As the direction of impact of the water increasingly tends to the radial direction (which no longer produces any torque), the obliqueness of the impact surfaces relative to the water increases while the obliqueness relative to the water decreases as the direction of impact tends away from the radial direction.

With the aid of the double-acting hydraulic cylinders 47, the cylindrical steel structural body 53 is always held at the optimum height relative to the water.

Changes in length of the steel structural body 53 as a result of thermal expansion are absorbed by the swivel bearing 43. To this end, the bearing 43 in the pillar 42 is a self-aligning bearing.

The operation of the wave power station with the cylindrical steel structural body 53 is dealt with above.

The dimensions of the power station illustrated in FIGS. 1 to 3 are for example; length of the steel structural body 53; 150 m; diameter: 40 m; radial height of the annular prominences 55: 6 m; depth of immersion with a calm sea: ½ m; weight of the steel structural body 53: 4000 t; buoyancy up to 9200 t.

In FIG. 2, instead of one of the double wheel rocker arms 50, a modification in the form of a rocker arm 70 having two skids 71 pivotally mounted thereon is shown. This solution is of advantage insofar as the surface pressure of the skids on the supports 44 is very much less than wheel pressure; also the skids offer the possibility of fixing the steel structural body at a desired height by hydraulic pressure.

FIG. 3 shows, on one support 44, the possibility of applying a cladding 72 which enhances flow.

I claim:

1. A power generating station comprising:
   (a) a body mounted for rotation about a predetermined axis thereof by the waves of the sea, said body having a plurality of protuberances which are coaxial with said body and are adapted to be impacted by the waves so as to rotate said body about said axis, and said protuberances being at least substantially annular through every cross-section thereof and tapering inwardly in a direction radially outward from said axis;
   (b) support means mounting said body for rotation about said axis; and
   (c) power generating means connected with said body.

2. A station as defined in claim 1, wherein said protuberances are arranged side-by-side.

3. A station as defined in claim 1, wherein said protuberances have substantially triangular cross-sections.

4. A station as defined in claim 1, wherein the radial height of said protuberances is in the range of about 4 to 8 meters.

5. A station as defined in claim 4, wherein said radial height is in the range of about 5 to 7 meters.

6. A station as defined in claim 1, wherein said body is arranged such that said protuberances are immersed in the sea to a fraction of the radial height thereof when the sea is calm.

7. A station as defined in claim 6, wherein said protuberances are immersed in the sea to at most one-quarter of said radial height when the sea is calm.

8. A station as defined in claim 1, wherein said protuberances define valleys with one another and said body is arranged such that the waves on average do not exceed a level of said body approximating the bottoms of said valleys.

9. A station as defined in claim 1, wherein said support means supports said body above the surface of the sea and said protuberances project into the waves from above.

10. A station as defined in claim 1, wherein said support means is stationarily mounted on the sea bed.

11. A station as defined in claim 10, wherein said support means comprises a column anchored to the sea bed.

12. A station as defined in claim 1, wherein said support means comprises lifting means for raising and lowering said body relative to the surface of the sea.

13. A station as defined in claim 12, wherein said lifting means comprises at least one hydraulic cylinder.

14. A station as defined in claim 13, wherein said cylinder is adapted to be stressed in both tension and compression.

15. A station as defined in claim 12, wherein said body is suspended from said lifting means.

16. A station as defined in claim 1, wherein said support means comprises at least one bearing which supports said body for rotation about said axis.

17. A station as defined in claim 1, wherein said support means comprises a pair of spaced columns and said body comprises a structural member which bridges said columns.

18. A station as defined in claim 1, wherein said body comprises an openworked structural member.

19. A station as defined in claim 1, wherein said body comprises a reinforced tubular structural member.

20. A station as defined in claim 1, wherein said body is cylindrical and said axis is the longitudinal axis of said body.

21. A station as defined in claim 1, wherein said body comprises a structural steel member.

22. A station as defined in claim 1, wherein the outer surface of said body is substantially water-tight.

23. A station as defined in claim 1, wherein the outer surface of said body has a closed cellular structure.

24. A station as defined in claim 1, wherein said axis is horizontal.

25. A power generating station comprising:
   (a) a body mounted for rotation about a predetermined axis thereof by the waves of the sea, said body having a plurality of protuberances each comprising a pair of substantially conical sections which are coaxial with said body and said projections being adapted to be impacted by the waves so as to rotate said body about said axis, and said protuberances tapering inwardly in a direction radially outward from said axis;
   (b) support means mounting said body for rotation about said axis; and
   (c) power generating means connected with said body.

* * * * *